UNITED STATES PATENT OFFICE.

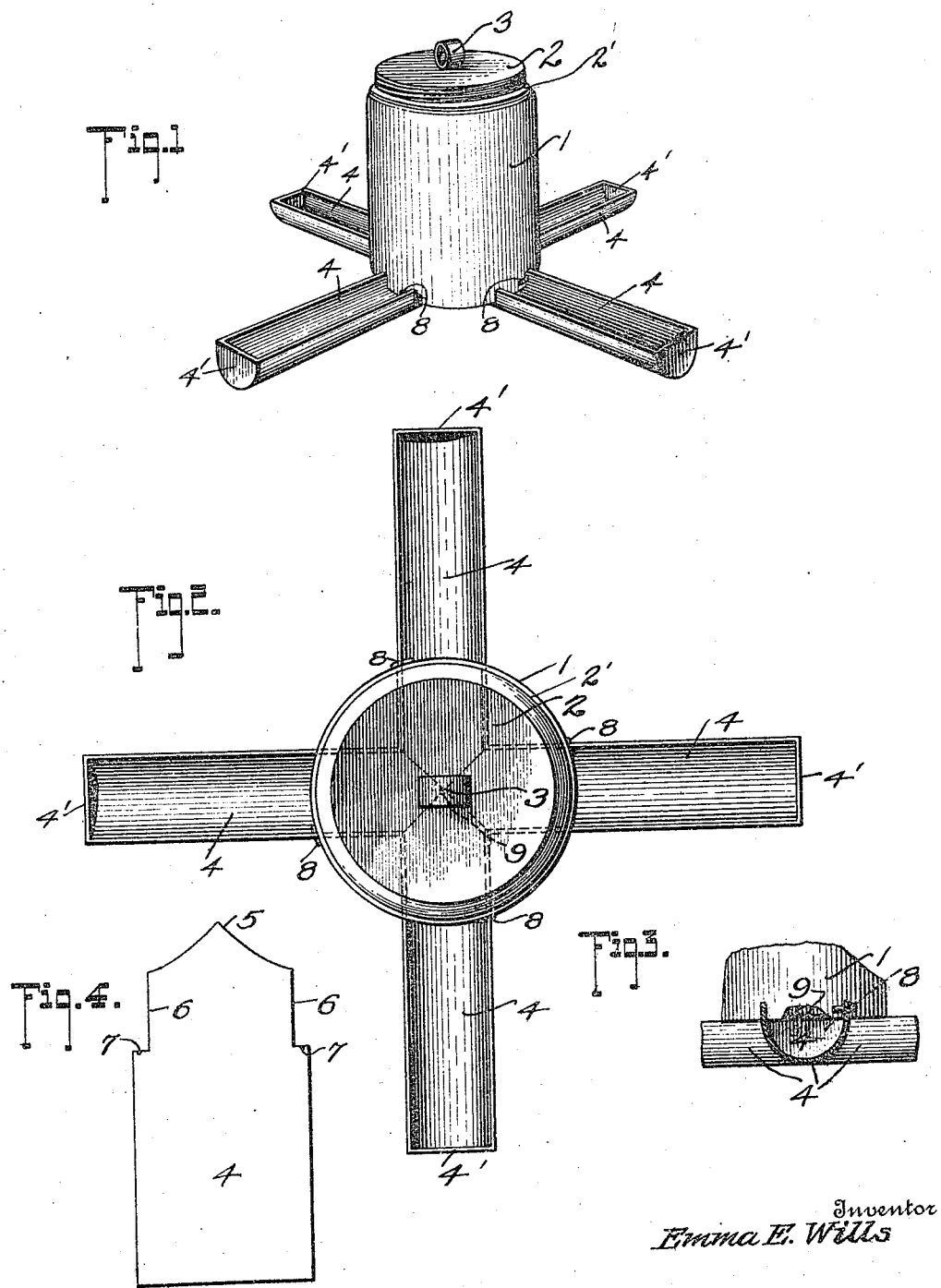

EMMA E. WILLS, OF CHETOPA, KANSAS.

POULTRY-FOUNTAIN.

1,045,653.

Specification of Letters Patent.  Patented Nov. 26, 1912.

Application filed February 19, 1912. Serial No. 678,438.

*To all whom it may concern:*

Be it known that I, EMMA E. WILLS, a citizen of the United States, residing at Chetopa, in the county of Labette and State of Kansas, have invented certain new and useful Improvements in Poultry-Fountains, of which the following is a specification.

This invention relates to improvements in poultry drinking fountains and has for its primary object to provide an inexpensive and sanitary device which can be easily cleaned, and is so constructed as to accommodate the greatest number of fowls with respect to the space occupied thereby.

A further object of my invention is to provide a plurality of drinking troughs in which will be maintained a full supply of fresh water, said troughs being of such a shape as to prevent the fowls from standing on the edges thereof, or in the same, resulting in the polution of the water, and wetting of the feet of young chicks, to which poultry raisers object.

For a full understanding of the present invention, reference is to be had to the following description and to the accompanying drawings, in which—

Figure 1 is a perspective view of the present invention. Fig. 2 is a top plan view. Fig. 3 is a detail fragmentary view partly in section showing the means for attaching the reservoir to the trough. Fig. 4 is a view showing a blank from which the trough extensions are made.

Throughout the following detail description and on the several figures of the drawings, similar parts are referred to by like reference characters.

Referring to the drawings, 1 denotes a reservoir, preferably cylindrical in shape, and provided with a cap or closure 2 for its upper end which preferably has a large opening so as to permit of readily cleansing the interior of the reservoir. A gasket 2' is interposed between the cap 2 and the reservoir in order to provide an air-tight closure and said cap 2 has a suitable ring or handle 3, by means of which the device can be carried.

Beneath the reservoir 1 is located the watering trough comprising a plurality of radial trough extensions projecting a suitable distance from the reservoir. Each of said extensions has its inner portion cut away, as indicated at 6 in Fig. 4, upon which the reservoir is adapted to be seated, said inner portions terminating in a point 5. The extensions 4 are suitably united centrally of the reservoir which abuts against the shoulders 10 formed by the cut-away portions in such a manner as to prevent lateral displacement of said extensions. As will be noted, the trough extensions 4 are semi-cylindrical in shape and are provided at their outer extremities with the ends 4'.

The reservoir 1 is formed adjacent to its bottom portion with a plurality of elongated projections 8 which are adapted to be engaged by slight circular movement in notches 7 in the shoulders 10 of the trough extensions 4. In this manner, the device as a whole may be moved from place to place or the reservoir can be readily disconnected from the trough for various purposes.

To fill the reservoir 1 the top 2 is removed and water poured into said reservoir, the top then being quickly replaced in position thereon. During the operation of filling, the water will escape through the opening 9 very slowly on account of its size and affording plenty of time to fill the reservoir before the trough has been filled. It will also be understood that the reservoir may be entirely removed from the trough by disengaging the projections 8 from engagement with the trough extensions for filling purposes, in which case the aperture 9 is preferably held closed by the finger, or otherwise, until said reservoir is replaced on the trough.

In the bottom portion of the reservoir 1 is an aperture 9 by means of which the water is supplied to the trough until the level rises sufficiently to submerge said opening, when atmospheric pressure will prevent further escape of the water. As soon as the opening 9 is on a level with the top of the cutaway portions the flow of water will be cut off when it reaches this height, the bottom of the reservoir fitting very snugly against said cutaway portions and sealing the same in an effectual manner.

The advantages of the present invention are numerous; the device can be very cheaply manufactured; a large number of fowls can be supplied with fresh water which is kept free from pollution; there are no tubes which will become clogged; it can be cleaned and refilled very easily by simply disengaging the reservoir from the trough. Should the aperture in the bottom of the reservoir 1 become clogged, it is only necessary to invert the same and, by inserting a wire or other instrument, the passage of the water will be freed, and this without the necessity of emptying the contents of the reservoir, as is done in many of the fountains now in use.

Another advantageous feature of the construction is, the trough extensions 4 are braced by contact of the upper portions of the inner ends thereof with the sides of the reservoir, this being desirable where the devices are subjected to rough treatment by fowls.

It is contemplated that the reservoir 1 may be made of glass or metal, as desired, and of any suitable size, and other changes in the form, proportion and details may be made without departing from the spirit of the invention.

Having thus described the invention, what is claimed as new is:

1. In a poultry fountain the combination of a reservoir having an opening at its upper portion and a closure therefor, said reservoir having also an aperture in its bottom portion, and a trough comprising radial trough extensions having their inner contiguous ends cut away at their upper edges to form a plurality of shoulders, said reservoir being seated on the cutaway portions and the shoulders of the extensions abutting against the side of the reservoir to prevent lateral displacement of the trough extensions.

2. In a poultry fountain the combination of a reservoir having an opening at its upper portion and a closure therefor, said reservoir having also an aperture in its bottom portion and being provided with projections adjacent to the bottom thereof, and a trough comprising radial trough extensions having their inner contiguous ends cut away at their upper edges to form a plurality of shoulders, said reservoir being seated on the cutaway portions and the shoulders of the extensions abutting against the side of the reservoir to prevent lateral displacement of the trough extensions, and said shoulders having notches therein adapted to interlock with the projections formed on the reservoir.

In testimony whereof I affix my signature in presence of two witnesses.

EMMA E. WILLS.

Witnesses:
DANL. WILLS,
W. H. TRAPP.

---

Copies of this patent may be obtained for five cents each, by addressing the "Commissioner of Patents, Washington, D. C."